US 8,248,552 B2

(12) United States Patent
Ting et al.

(10) Patent No.: US 8,248,552 B2
(45) Date of Patent: Aug. 21, 2012

(54) PIXEL ARRAY, POLYMER STABILIZED ALIGNMENT LIQUID CRYSTAL DISPLAY PANEL, AND ELECTRO-OPTICAL APPARATUS

(75) Inventors: Tien-Lun Ting, Taichung (TW); Wen-Hao Hsu, Hsinchu County (TW); Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 448 days.

(21) Appl. No.: 12/652,009

(22) Filed: Jan. 4, 2010

(65) Prior Publication Data

US 2011/0096257 A1 Apr. 28, 2011

(30) Foreign Application Priority Data

Oct. 26, 2009 (TW) ................................ 98136187 A

(51) Int. Cl.
G02F 1/136 (2006.01)
(52) U.S. Cl. ........................................................ 349/48
(58) Field of Classification Search ...................... 349/48
See application file for complete search history.

(56) References Cited

U.S. PATENT DOCUMENTS

| 7,859,510 B2* | 12/2010 | Umezaki ........................ 345/100 |
| 7,978,274 B2* | 7/2011 | Umezaki et al. .................. 349/42 |
| 2006/0290827 A1 | 12/2006 | Kihara et al. |
| 2007/0064164 A1 | 3/2007 | Tasaka et al. |
| 2008/0284929 A1* | 11/2008 | Kimura ............................ 349/38 |
| 2010/0253869 A1* | 10/2010 | Ting et al. ........................ 349/48 |
| 2011/0128455 A1* | 6/2011 | Tsubata ........................ 348/790 |

FOREIGN PATENT DOCUMENTS

| CN | 1591138 | 3/2005 |
| CN | 101354512 | 1/2009 |
| CN | 101504503 | 8/2009 |

OTHER PUBLICATIONS

"First Office Action of China Counterpart Application", issued on Oct. 13, 2010, p. 1-p. 6, in which the listed references were cited.

* cited by examiner

Primary Examiner — Timothy L Rude
(74) Attorney, Agent, or Firm — Jianq Chyun IP Office

(57) ABSTRACT

A pixel array including first scan lines, second scan lines, data lines, sub-pixels, and common lines is provided. Each of the sub-pixels includes a first switch, a second switch, a first pixel electrode, a second pixel electrode, and a third switch. The first switch and the second switch are electrically connected to the same scan line and same data line, the first pixel electrode is electrically connected to the first switch, the second pixel electrode is electrically connected to the second switch, and the first pixel electrode and the second pixel electrode are disposed at opposite sides of the first scan line. Furthermore, the third switch has a capacitance coupling portion extending under the first pixel electrode in the neighboring sub-pixel such that a voltage adjusting capacitor is formed by the capacitance coupling portion and one of the common lines in the neighboring sub-pixel.

18 Claims, 4 Drawing Sheets

US 8,248,552 B2

PIXEL ARRAY, POLYMER STABILIZED ALIGNMENT LIQUID CRYSTAL DISPLAY PANEL, AND ELECTRO-OPTICAL APPARATUS

CROSS-REFERENCE TO RELATED APPLICATION

This application claims the priority benefit of Taiwan application serial no. 98136187, filed on Oct. 26, 2009. The entirety of the above-mentioned patent application is hereby incorporated by reference herein and made a part of specification.

BACKGROUND OF THE INVENTION

1. Field of the Invention

The present invention relates to a polymer stabilized alignment liquid crystal display (PSA-LCD) panel and more particularly to a pixel array design in a polymer stabilized alignment liquid crystal display panel.

2. Description of Related Art

With the continuous advancement of larger-sized LCDs, the demand for progress and breakthroughs in wide-viewing-angle technology are growing to resolve the problem of viewing-angle resulted from larger display size. The polymer stabilized alignment liquid crystal display panel having unique pixel electrode pattern is widely applied to various electronic products. Since the polymer stabilized alignment liquid crystal display panel still suffers from the color washout problem, the conventional technique designs a layout having a main display region and a sub-display region for each of the sub-pixels in the polymer stabilized alignment liquid crystal display panel and the main display region and the sub-display region in the same sub-pixel are applied with different voltages respectively through the adequate circuit design and driving method to improve the color washout situation.

SUMMARY OF THE INVENTION

The present invention provides a pixel array, a polymer stabilized alignment liquid crystal display panel and an electro-optical device which have a relatively better display quality.

The present invention provides a pixel array having a plurality of first scan lines, a plurality of second scan lines, a plurality of data lines, a plurality of sub-pixels, and a plurality of common lines which are connected to one another. Each of the second scan lines is configured between two adjacent first scan lines. The data lines are intersected with the first scan lines and the second scan lines, wherein the second scan lines and the data lines together define a plurality of sub-pixel regions. The sub-pixels are configured in the sub-pixel regions, and each of the sub-pixels is electrically connected to one of the first scan lines, one of the second scan lines and one of the data lines, and each of the sub-pixels has a first switch, a second switch, a first pixel electrode, a second pixel electrode and a third switch. The first switch and the second switch are electrically connected to the same first scan line and the same data line. The first pixel electrode is electrically connected to the first switch. The second pixel electrode is electrically connected to the second switch, and the first pixel electrode and the second pixel electrode are respectively configured at the opposite sides of the first scan line. The third switch is electrically connected to the second scan line and the second pixel electrode, and the third switch has a capacitance coupling portion disconnected to the second scan line and the second pixel electrode. The capacitance coupling portion extends to be under the first pixel electrode in the neighboring sub-pixel, and the capacitance coupling portion is coupled with the common line in the neighboring sub-pixel to form a voltage adjusting capacitor. Moreover, the common line is configured under the first pixel electrode and the second pixel electrode.

In one embodiment of the present invention, an extended direction of each of the first scan lines is substantially parallel to an extended direction of each of the second scan lines.

In one embodiment of the present invention, the sub-pixels are arranged in a plurality of rows, and the sub-pixels arranged in the same row are electrically connected to the same first scan line and the same second scan line. Moreover, the first scan line and the second scan line electrically connected to the sub-pixels in the same row are electrically insulated from each other.

In one embodiment of the present invention, the sub-pixels are arranged in a plurality of rows, and the capacitance coupling portions of the sub-pixels arranged in the nth row extends to be under the first pixel electrodes of the sub-pixels in the (n+1)th row and n is an integer. For instance, each of the second scan lines is configured between the second pixel electrodes of the sub-pixels in the nth row and the first pixel electrodes of the sub-pixels in the (n+1)th row.

In one embodiment of the present invention, each of the first switch is a first thin film transistor, and the first thin film transistor has a first gate electrically connected to one of the first scan lines, a first source electrically connected to one of the data lines and a first drain electrically connected to the first pixel electrode.

In one embodiment of the present invention, each of the second switch is a second thin film transistor, and the second thin film transistor has a second gate electrically connected to one of the first scan lines, a second source electrically connected to one of the data lines and a second drain electrically connected to the second pixel electrode.

In one embodiment of the present invention, each of the third switch is a third thin film transistor, and the third thin film transistor has a third gate electrically connected to one of the second scan lines, a third source electrically connected to the second pixel electrode, and a third drain electrically connected with the capacitance coupling portion.

In one embodiment of the present invention, the third source is directly connected to the second pixel electrode.

In one embodiment of the present invention, an extended direction of each of the common lines is substantially parallel to an extended direction of each of the first scan lines.

In one embodiment of the present invention, the pixel array further comprises a color filter layer covering the first scan lines, the second scan lines, the data lines, the sub-pixels and the common lines. In one preferred embodiment, each of the sub-pixels further comprises a first capacitor electrode and a second capacitor electrode. The first capacitor electrode is configured under the color filter layer and electrically connected to the first pixel electrode, and the first capacitor electrode and one of the common lines together fin a first storage capacitor. The second capacitor electrode is configured under the color filter layer and electrically connected to the second pixel electrode, and the second capacitor electrode and one of the common lines together form a second storage capacitor.

In one embodiment of the present invention, the first pixel electrode and the second pixel electrode extend to be over the first scan lines and/or second scan lines.

In one embodiment of the present invention, each of the first pixel electrodes has a plurality of first slits for respectively defining a plurality of first display domains, and each of the second pixel electrodes has a plurality of second slits for respectively defining a plurality of second display domains.

In one embodiment of the present invention, each of the sub-pixels and the neighboring sub-pixel are configured in the same column.

The invention further provides a pixel array having a plurality of first scan lines, a plurality of data lines intersected with the first scan lines, a plurality of sub-pixels and a plurality of common lines. Each of the sub-pixels is electrically connected to one of the first scan lines and one of the data lines. Each of the sub-pixels comprises a pixel electrode and a switch electrically connected to the pixel electrode. The switch has a capacitance coupling portion, and the capacitance coupling portion and the common line in the neighboring pixel together form a voltage adjusting capacitor.

The present invention further provides a polymer stabilized alignment liquid crystal display panel which includes a first substrate, a second substrate, two polymer stabilized alignment layers and a liquid crystal layer. The first substrate has the aforementioned pixel array, the second substrate is configured over the first substrate, and the two polymer stabilized alignment layers are configured on the first substrate and the second substrate respectively. Furthermore, the liquid crystal layer is configured between the polymer stabilized alignment layers.

In one embodiment of the present invention, the polymer stabilized alignment liquid crystal display panel further comprises two alignment layers respectively configured between the first substrate and the polymer stabilized alignment layer corresponding to the first substrate and between the second substrate and the polymer stabilized alignment layer corresponding to the second substrate.

The present invention further provides an electric-optical device including the aforementioned pixel array or the aforementioned polymer stabilized alignment liquid crystal display panel.

Accordingly, in the pixel array of the present invention, the capacitance coupling portion extends to be under the first pixel electrode in the neighboring sub-pixel and is coupled with the common line in the neighboring sub-pixel to form a voltage adjusting capacitor. Therefore, the opening ratio of the pixel array of the present invention is relatively high.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
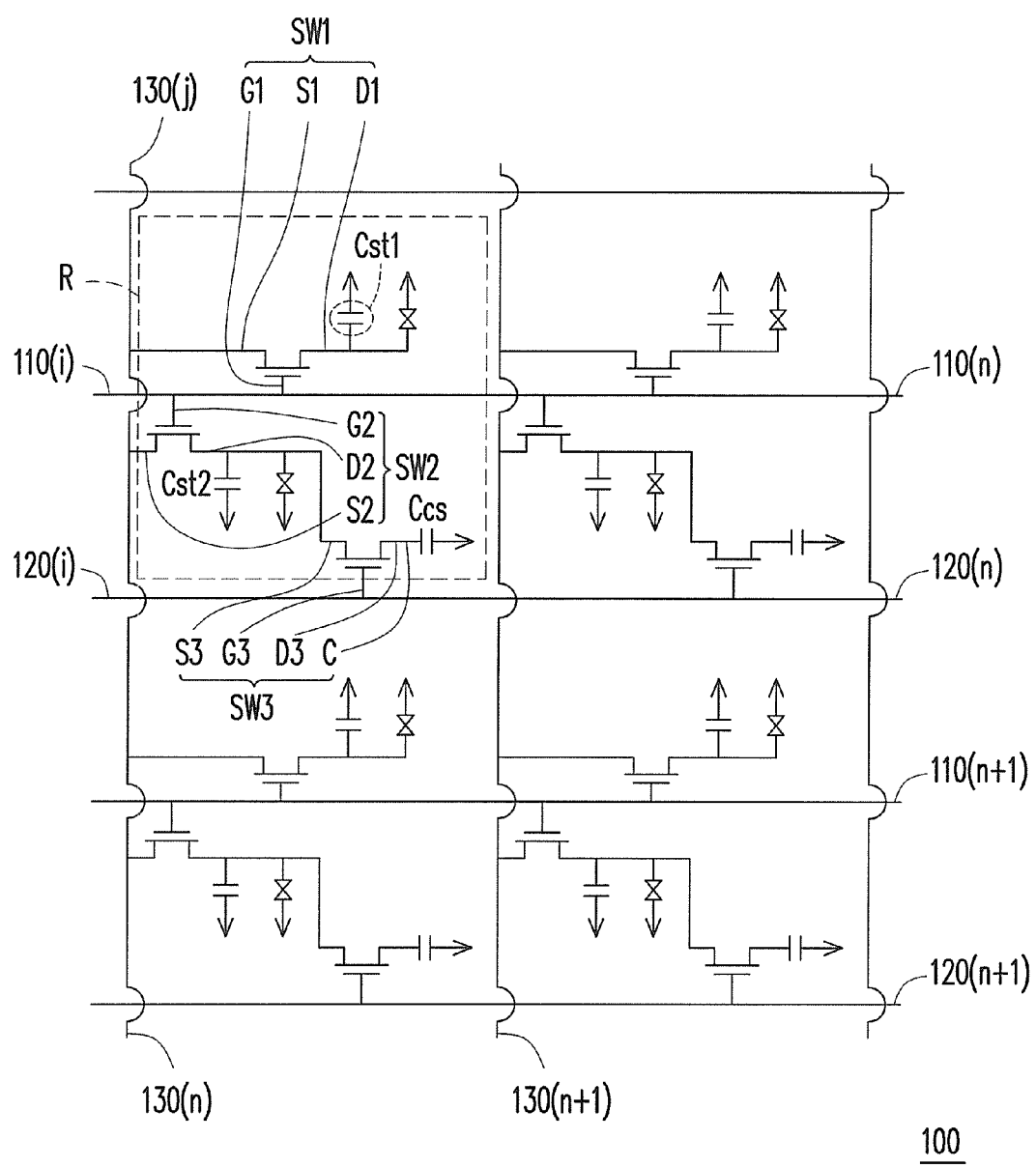
FIG. 1 is a circuit diagram of a pixel array according to one embodiment of the present invention.
Figure 2:
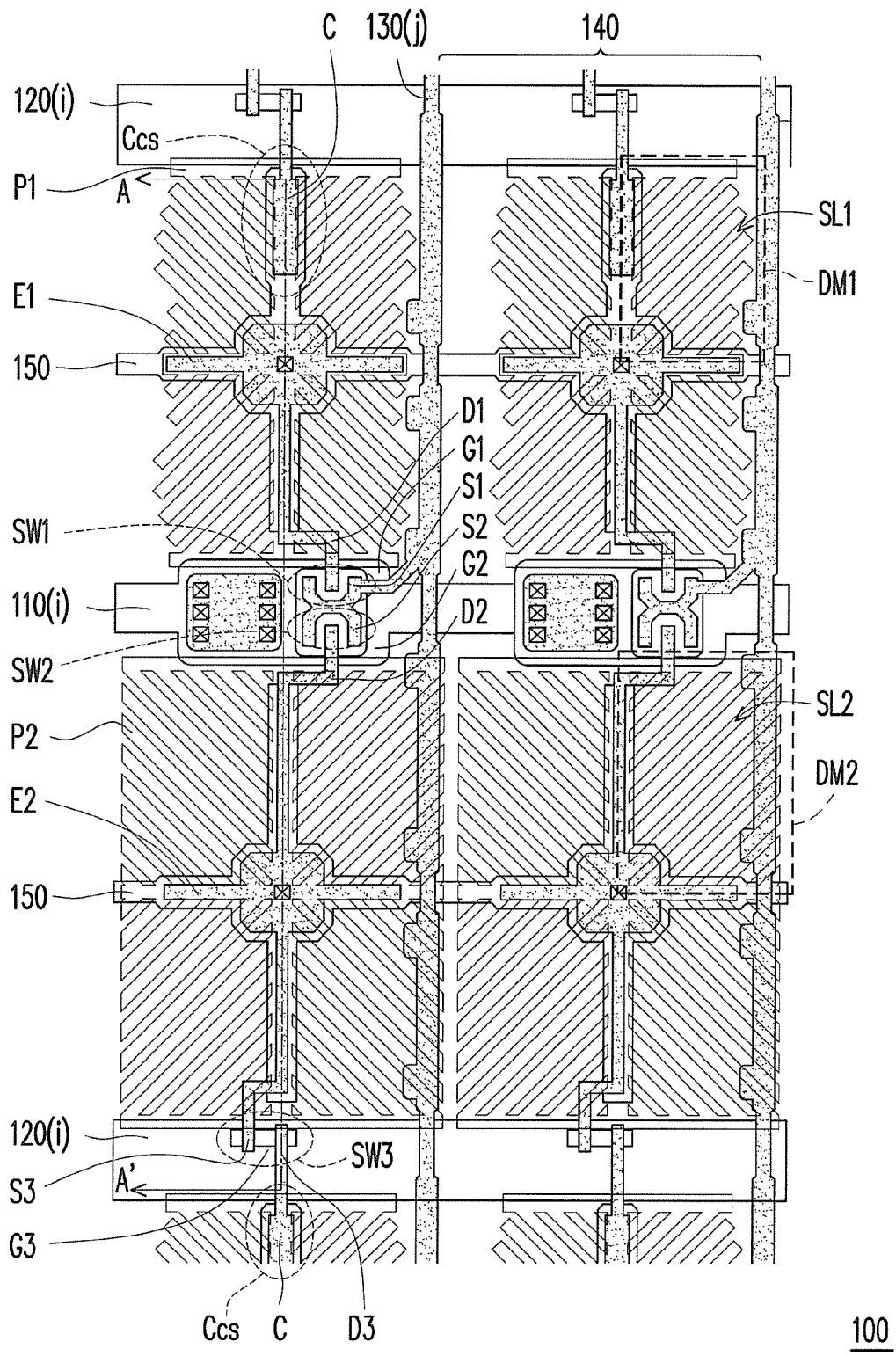
FIG. 2 is a schematic top view of a pixel array according to one embodiment of the present invention.

FIG. 1 is a circuit diagram of a pixel array according to one embodiment of the present invention and FIG. 2 is a schematic top view of a pixel array according to one embodiment of the present invention. As shown in FIG. 1 and FIG. 2, a pixel array 100 of the present embodiment comprises a plurality of first scan lines 110, a plurality of second scan lines 120, a plurality of data lines 130, a plurality of sub-pixels 140 and a plurality of common lines 150. The common lines 150, for example, are connected to one another. The sub-pixels 140 are arranged in a plurality of rows. More specifically, the first scan line 110(i) and the second scan line 120(i) are electrically connected to the sub-pixels 140 arranged in the ith row. Further, the data line 130(j) is electrically connected to the sub-pixels 140 arranged in the jth column. It should be noticed that i and j are integers (e.g. 1, 2, 3, . . . , n, n+1). Moreover, the first scan line 110(i) and the second scan line 120(i) electrically connected to the sub-pixels 140 in the ith row are electrically insulated from each other.

In the present embodiment, the extending directions of the first scan line 110(i), the second scan line 120(i) and the common lines 150 are substantially parallel to one another, and the extending direction of the data line 130(j) is perpendicular to the extending direction of the first scan line 110(i).

Each of the second scan lines 120 is configured between two adjacent first scan lines 110. For instance, the second scan line 120($n$) connected to the sub-pixels 140 in the nth row is configured between the first scan line 110($n$) and the first scan line 110($n$+1). Moreover, the data lines 130 are intersected with the first scan lines 110 and the second scan lines 120, and the second scan lines 120 and the data lines 130 together define a plurality of sub-pixel regions R. The sub-pixel 140 is configured in the sub-pixel region R, and arranged in the ith row and the jth column is electrically connected to the first scan line 110(i), the second scan line 120(i) and the data line 130(j).

As shown in FIG. 1 and FIG. 2, the sub-pixel 140 arranged in the ith row and the jth column comprises a first switch SW1, a second switch SW2, a first pixel electrode P1, a second pixel electrode P2 and a third switch SW3. The first switch SW1 and the second switch SW2 are electrically connected to the same first scan line 110(i) and the same data line 130(j). The first pixel electrode P1 is electrically connected to the first switch SW1, the second pixel electrode P2 is electrically connected to the second switch SW2, and the first pixel electrode P1 and the second pixel electrode P2 are respectively configured at the opposite sides of the first scan line 110(i). The third switch SW3 is electrically connected to the second scan line 120(i) and the second pixel electrode P2, and the third switch SW3 has a capacitance coupling portion C disconnected to the second scan line 120(i) and the second pixel electrode P2. The capacitance coupling portion C extends to be under the first pixel electrode P1 in the neighboring sub-pixel 140, and the capacitance coupling portion and the common line in the neighboring sub-pixel at the same column (e.g. the sub-pixel and the neighboring sub-pixel are connected to the same data line 130(j)) together form a voltage adjusting capacitor $C_{CS}$. Specifically, the capacitance coupling portion C of the sub-pixel 140 in the nth row extends to be under the first pixel electrode P1 of the sub-pixel 140 in the (n+1)th row so that the capacitance coupling portion C of the sub-pixel 140 in the nth row is coupled to the common line 150 of the sub-pixel 140 in the (n+1)th row to form a voltage adjusting capacitor $C_{CS}$. Moreover, the common line 150 is configured under the first pixel electrode P1 and the second pixel electrode P2.

In one embodiment of the present invention, the first switch SW1 is a first thin film transistor, and the first thin film transistor has a first gate G1 electrically connected to the first scan line 110(i), a first source S1 electrically connected to the data line 130(j) and a first drain D1 electrically connected to the first pixel electrode P1. The second switch SW2 is a second thin film transistor, and the second thin film transistor has a second gate G2 electrically connected to the first scan line 110(i), a second source S2 electrically connected to the data line 130(j) and a second drain D2 electrically connected to the second pixel electrode P2. The third switch SW3 is a third thin film transistor, and the third thin film transistor has a third gate G3 electrically connected to the second scan line 120(i), a third source S3 electrically connected to the second pixel electrode P2, and a third drain D3 electrically connected with the aforementioned capacitance coupling portion C. It is noted that the third drain D3 and the capacitance coupling portion C may be formed by a single conductive pattern. In other words, the single conductive pattern is defined into two portions, wherein one portion is third drain D3 and the other portion is the capacitance coupling portion C. In an alternative embodiment, the third drain D3 and the capacitance coupling portion C may be formed by different conductive patterns electrically connected with each other.

It should be noticed that sub-pixels 140 of the present embodiment can be applied into a polymer stabilized alignment liquid crystal display panel. Specifically, the first pixel electrode P1 has a plurality of first slits SL1 for respectively defining a plurality of first display domains DM1, and the second pixel electrode P2 has a plurality of second slits SL2 for respectively defining a plurality of second display domains DM 2. Because of the plural first display domains DM1 and the plural second display domains DM2, the sub-pixel 140 possesses the wide viewing angle feature. As shown in FIG. 2, the first pixel electrode P1 has four first slits SL1 so that the first pixel electrode P1 is divided into four first display domains DM1, and the second pixel electrode P2 also has four second slits SL2 so that the second pixel electrode P2 is divided into four second display domains DM2. In other words, the sub-pixel 140 has eight display domains, which can improve the color washout situation. Further, the pattern designs of the first pixel electrode P1 and the second pixel electrode P2 can be adjusted according to the user requirements so that the number of the display domains is increased and are not limited by the present embodiment.

Besides the pixel electrode design shown in FIG. 2, other designs of the first pixel electrode P1 and the second pixel electrode P2 can be also adopted in the practical applications. The present invention is not limited to the patterns of the first pixel electrode P1 and the second pixel electrode P2.

Figure 3:
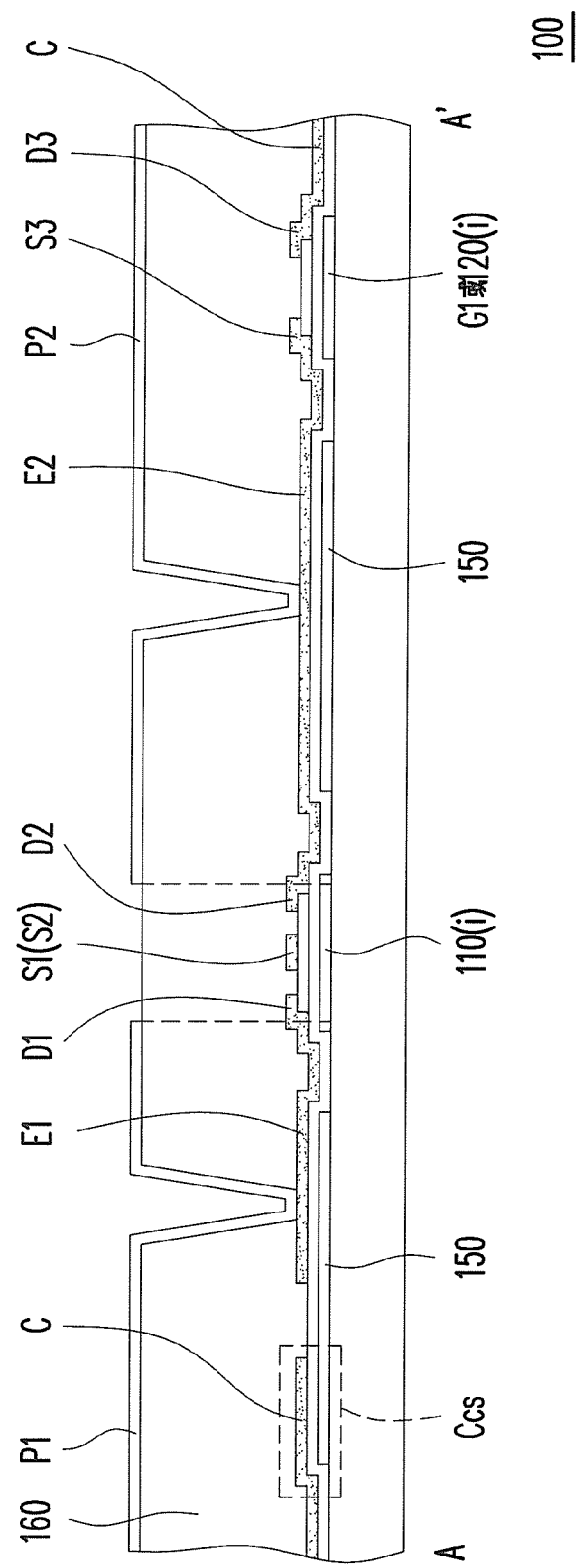
FIG. 3 is a cross-sectional view along line A-A' in FIG. 2.

FIG. 3 is a cross-sectional view along line A-A' in FIG. 2. As shown in FIG. 2 and FIG. 3, in the preferred embodiment of the present invention, the formation of the aforementioned pixel array 100 can be integrated with the formation of the conventional color filter on array (COA). When a color filter layer 160 is formed to be under the first pixel electrode P1 and the second pixel electrode P2 and to cover the first scan line 110(i), the second scan line 120(i), the data line 130(j), the sub-pixel 140 and the common line 150, the formation of the color filter layer 160 does not cause the difficulty to the formation of the voltage adjusting capacitor $C_{CS}$ because the capacitance coupling portion C and the common line 150 are both configured under the color filter layer 160.

Each of the sub-pixels 140 can further comprise a first capacitor electrode E1 and a second capacitor electrode E2. The first capacitor electrode E1 is configured under the color filter layer 160 and electrically connected to the first pixel electrode P1, and the first capacitor electrode E1 and one of the common lines 150 together form a first storage capacitor Cst1. The common line 150 can be, for example, a crisscross type. The second capacitor electrode E2 is configured under the color filter layer 160 and electrically connected to the second pixel electrode P2, and the second capacitor electrode E2 and one of the common lines 150 together form a second storage capacitor Cst2. The common line 150 can be, for example, a crisscross type. As shown in FIG. 2 and FIG. 3, the first capacitor electrode E1 can be, for example, electrically connected to the first drain D1. For example, the first capacitor electrode E1 is directly connected to the first drain D1. The second capacitor electrode E2 can be, for example, electrically connected to the second drain D2. For example, the second capacitor electrode E2 is directly connected to the second drain D2. Further, the third source S3 is electrically connected to the second pixel electrode P2 through the second capacitor electrode E2. Moreover, the present embodiment does not limit that the third source S3 electrically connected to the second pixel electrode P2 has to be through the second capacitor electrode E2. That is, the third source S3 also can be electrically connected to the second pixel electrode P2 through a contact window (not shown).

As shown in FIG. 3, the first pixel electrode P1 and the second pixel electrode P2 of the present embodiment can selectively extend to be over the first scan line 110(i) and/or the second scan line 120(i). Since the thickness of the color filter layer 160 is relatively large, the parasitic capacitance between the pixel electrodes P1 and P2 and the first scan line 110(i) and the parasitic capacitance between the pixel electrodes P1 and P2 and the second scan line 120(i) can be greatly decreased.

Figure 4:
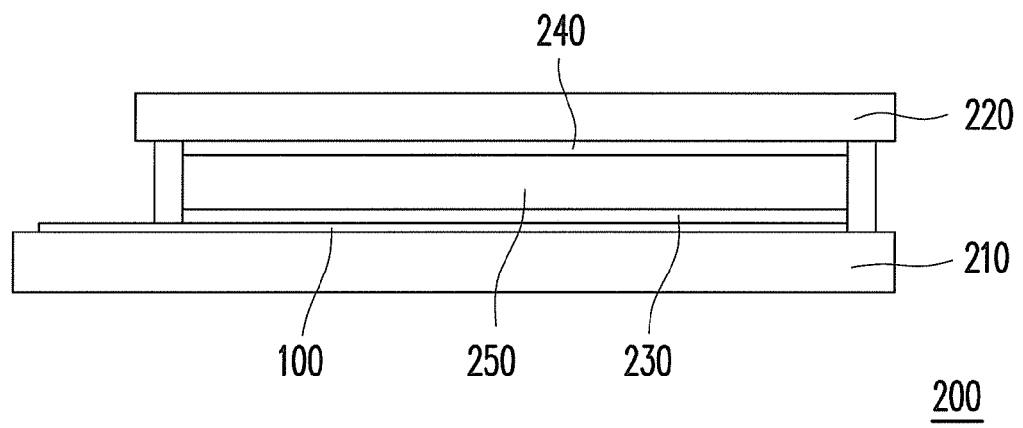
FIG. 4 is a schematic view of a polymer stabilized alignment liquid crystal display panel according to one embodiment of the present invention.

FIG. 4 is a schematic view of a polymer stabilized alignment liquid crystal display panel according to one embodiment of the present invention. As shown in FIG. 4, a polymer stabilized alignment liquid crystal display panel 200 of the present embodiment includes a first substrate 210, a second substrate 220, two polymer stabilized alignment layers 230 and 240, and a liquid crystal layer 250. The first substrate 210 has the pixel array mentioned in the previous embodiments, the second substrate 220 is configured over the first substrate 210, and the two polymer stabilized alignment layers 230 and 240 are configured on the first substrate 210 and the second substrate 220 respectively. Furthermore, the liquid crystal layer 250 is configured between the polymer stabilized alignment layers 230 and 240. It should be noticed that the liquid crystal layer 250 is made of the liquid crystal material having monomers which can be polymerized by the energy source. When the energy source, such as ultraviolet, is applied to the liquid crystal layer 250, the monomers are polymerized on the surface of the first substrate 210 and the surface of the second substrate 220 respectively to form the polymer stabilized alignment layers 230 and 240 respectively. Also, the polymer stabilized alignment liquid crystal display panel 200 of the present embodiment can further comprise, for example but not limited to, two auxiliary alignment layers (not shown) respectively configured between the first substrate 210 and the polymer stabilized alignment layer 230 corresponding to the first substrate 210 and between the second substrate 220 and the polymer stabilized alignment layer 240 corresponding to the second substrate 220. The auxiliary alignment layers can be, for example, made of polyimide.

Figure 5:
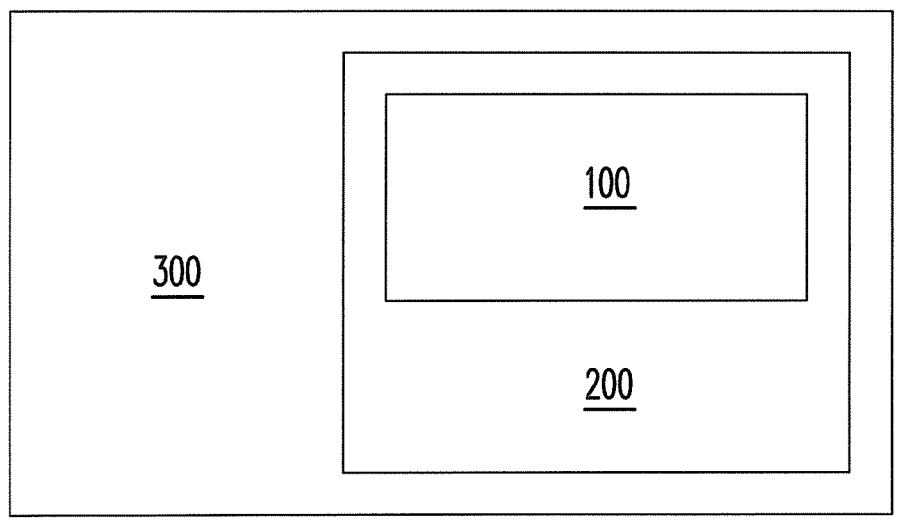
FIG. 5 is a schematic view of an electro-optical device according to one embodiment of the present invention.

FIG. 5 is a schematic view of an electro-optical device according to one embodiment of the present invention. As shown in FIG. 5, the present embodiment further provides an electric-optical device 300 including the aforementioned pixel array 100 or the aforementioned polymer stabilized alignment liquid crystal display panel 200 shown in FIG. 3. The aforementioned electro-optical device comprises a portable product (e.g. a mobile phone, a camcorder, a camera, a laptop computer, a game player, a watch, a music player, an e-mail receiver and sender, a map navigator, a digital picture, or the like), an audio-video product (e.g. an audio-video player or the like), a screen, a television, a bulletin, a panel in a projector, and so on.

Accordingly, in the pixel array of the present invention, the capacitance coupling portion extends to be under the first pixel electrode in the neighboring sub-pixel and is coupled with the common line in the neighboring sub-pixel to form a voltage adjusting capacitor. Therefore, the opening ratio of the pixel array of the present invention is relatively high. Moreover, the process for forming the disclosed designs of the pixel arrays in some of the embodiments of the present invention is compatible with the conventional fabrication process of the color filter on array. Thus, the pixel opening ratio can be increased.

What is claimed is:

1. A pixel array, comprising:
   a plurality of first scan lines;
   a plurality of second scan lines, wherein each of the second scan lines is located between two adjacent first scan lines;
   a plurality of data lines substantially intersected with the first scan lines and the second scan lines, wherein the second scan lines and the data lines together define a plurality of sub-pixel regions;
   a plurality of sub-pixels located in the sub-pixel regions, wherein each of the sub-pixels is electrically connected with one of the first scan lines, one of the second scan lines and one of the data lines respectively, and each of the sub-pixels comprises:
      a first switch;
      a second switch, wherein the first switch and the second switch are electrically connected with the same first scan line and the same data line;
      a first pixel electrode electrically connected with the first switch;
      a second pixel electrode electrically connected with the second switch, wherein the first pixel electrode and the second pixel electrode are respectively located at the opposite sides of the first scan line; and
      a third switch electrically connected with the second scan line and the second pixel electrode, wherein the third switch includes a capacitance coupling portion extending to be under the first pixel electrode in the neighboring sub-pixel; and
   a plurality of common lines, wherein the capacitance coupling portion and the common line in the neighboring sub-pixel together form a voltage adjusting capacitor.

2. The pixel array of claim 1, wherein an extending direction of each of the first scan lines is substantially parallel to an extending direction of each of second scan lines.

3. The pixel array of claim 1, wherein the sub-pixels are arranged in a plurality of rows, and the sub-pixels arranged in the same row are electrically connected to the same first scan line and the same second scan line.

4. The pixel array of claim 1, wherein the sub-pixels are arranged in a plurality of rows, and the capacitance coupling portions of the sub-pixels arranged in the nth row extends to be under the first pixel electrodes of the sub-pixels in the (n+1)th row and n is an integer.

5. The pixel array of claim 4, wherein each of the second scan lines is located between the second pixel electrodes of the sub-pixels in the nth row and the first pixel electrodes of the sub-pixels in the (n+1)th row.

6. The pixel array of claim 1, wherein each of the first switches is a first thin film transistor, and the first thin film transistor includes:
   a first gate electrically connected with one of the first scan lines;
   a first source electrically connected with one of the data lines; and
   a first drain electrically connected with the first pixel electrode.

7. The pixel array of claim 1, wherein each of the second switches is a second thin film transistor, and the second thin film transistor includes:
   a second gate electrically connected with one of the first scan lines;
   a second source electrically connected with one of the data lines; and
   a second drain electrically connected with the second pixel electrode.

8. The pixel array of claim 1, wherein each of the third switches is a third thin film transistor, and the third thin film transistor further includes:
   a third gate electrically connected with one of the second scan lines;
   a third source electrically connected with the second pixel electrode; and
   a third drain electrically connected with the capacitance coupling portion.

9. The pixel array of claim 1, wherein each of the sub-pixels and the neighboring sub-pixel are arranged in the same column.

10. The pixel array of claim 1, wherein an extending direction of one of the common lines is substantially parallel to the extending direction of one of first scan lines.

11. The pixel array of claim 1, further comprising a color filter layer covering the first scan lines, the second scan lines, the data lines, the sub-pixels and the common lines.

12. The pixel array of claim 11, wherein each of the sub-pixels further comprises:
   a first capacitor electrode located under the color filter layer and electrically connected to the first pixel electrode, and the first capacitor electrode and one of the common lines together form a first storage capacitor; and
   a second capacitor electrode located under the color filter layer and electrically connected to the second pixel electrode, and the second capacitor electrode and one of the common lines together form a second storage capacitor.

13. The pixel array of claim 11, wherein the first pixel electrodes and the second pixel electrodes extend to be overlapped with the first scan lines.

14. The pixel array of claim 11, wherein the first pixel electrodes and the second pixel electrodes extend to be overlapped with the second scan lines.

15. The pixel array of claim 1, wherein each of the first pixel electrodes has a plurality of first slits to respectively form a plurality of first display domains, and each of the second pixel electrodes has a plurality of second slits to respectively form a plurality of second display domains.

16. A polymer stabilized alignment liquid crystal display panel, comprising:
   a first substrate comprising a pixel array, the pixel array comprising:
      a plurality of first scan lines;
      a plurality of second scan lines, wherein each of the second scan lines is located between two adjacent first scan lines;
      a plurality of data lines substantially intersected with the first scan lines and the second scan lines, wherein the second scan lines and the data lines together define a plurality of sub-pixel regions;

a plurality of sub-pixels located in the sub-pixel regions, wherein each of the sub-pixels is electrically connected with one of the first scan lines, one of the second scan lines and one of the data lines respectively, and each of the sub-pixels comprises:
  a first switch;
  a second switch, wherein the first switch and the second switch are electrically connected with the same first scan line and the same data line;
  a first pixel electrode electrically connected with the first switch;
  a second pixel electrode electrically connected with the second switch, wherein the first pixel electrode and the second pixel electrode are respectively located at the opposite sides of the first scan line; and
  a third switch electrically connected with the second scan line and the second pixel electrode, wherein the third switch includes a capacitance coupling portion extending to be under the first pixel electrode in the neighboring sub-pixel; and
  a plurality of common lines, wherein the capacitance coupling portion and the common line in the neighboring sub-pixel together form a voltage adjusting capacitor;
a second substrate disposed over the first substrate;
two polymer stabilized alignment layers disposed on the first substrate and the second substrate, respectively; and
a liquid crystal layer disposed between the two polymer stabilized alignment layers.

17. The polymer stabilized alignment liquid crystal display panel of claim 16, further comprising two auxiliary alignment layers respectively disposed between the first substrate and the polymer stabilized alignment layer corresponding to the first substrate and between the second substrate and the polymer stabilized alignment layer corresponding to the second substrate.

18. An electro-optical device, comprising a pixel array, the pixel array comprising:
  a plurality of first scan lines;
  a plurality of second scan lines, wherein each of the second scan lines is located between two adjacent first scan lines;
  a plurality of data lines substantially intersected with the first scan lines and the second scan lines, wherein the second scan lines and the data lines together define a plurality of sub-pixel regions;
  a plurality of sub-pixels located in the sub-pixel regions, wherein each of the sub-pixels is electrically connected with one of the first scan lines, one of the second scan lines and one of the data lines respectively, and each of the sub-pixels comprises:
    a first switch;
    a second switch, wherein the first switch and the second switch are electrically connected with the same first scan line and the same data line;
    a first pixel electrode electrically connected with the first switch;
    a second pixel electrode electrically connected with the second switch, wherein the first pixel electrode and the second pixel electrode are respectively located at the opposite sides of the first scan line; and
    a third switch electrically connected with the second scan line and the second pixel electrode, wherein the third switch includes a capacitance coupling portion extending to be under the first pixel electrode in the neighboring sub-pixel; and
  a plurality of common lines, wherein the capacitance coupling portion and the common line in the neighboring sub-pixel together form a voltage adjusting capacitor.

* * * * *